(12) United States Patent
Mathews

(10) Patent No.: US 8,306,734 B2
(45) Date of Patent: Nov. 6, 2012

(54) NAVIGATION SYSTEM WITH PARKING SPACE LOCATOR MECHANISM AND METHOD OF OPERATION THEREOF

(75) Inventor: Emily Jaye Mathews, Palo Alto, CA (US)

(73) Assignee: TeleNav, Inc., Sunnyvale, CA (US)

( * ) Notice: Subject to any disclaimer, the term of this patent is extended or adjusted under 35 U.S.C. 154(b) by 354 days.

(21) Appl. No.: 12/723,524

(22) Filed: Mar. 12, 2010

(65) Prior Publication Data
US 2011/0224899 A1 Sep. 15, 2011

(51) Int. Cl.
*G01C 21/36* (2006.01)
(52) U.S. Cl. ......... 701/408; 701/423; 701/516; 701/517
(58) Field of Classification Search .................. None
See application file for complete search history.

(56) References Cited

U.S. PATENT DOCUMENTS

| | | | |
|---|---|---|---|
| 5,748,107 A * | 5/1998 | Kersken et al. ................ 340/905 |
| 5,910,782 A * | 6/1999 | Schmitt et al. ............ 340/995.12 |
| 6,133,855 A * | 10/2000 | Kim ............................ 340/932.2 |
| 6,147,624 A * | 11/2000 | Clapper ...................... 340/932.2 |
| 6,266,609 B1 | 7/2001 | Fastenrath |
| 6,285,297 B1 * | 9/2001 | Ball ............................ 340/932.2 |
| 6,411,895 B1 | 6/2002 | Lau et al. |
| 6,426,708 B1 * | 7/2002 | Trajkovic et al. ........... 340/932.2 |
| 6,501,391 B1 * | 12/2002 | Racunas, Jr. ............... 340/932.2 |
| 6,559,776 B2 | 5/2003 | Katz |
| 6,750,786 B1 * | 6/2004 | Racunas, Jr. ............... 340/932.2 |
| 6,885,311 B2 | 4/2005 | Howard et al. |
| 6,927,700 B1 | 8/2005 | Quinn |
| 7,023,360 B2 * | 4/2006 | Staniszewski ............. 340/932.2 |
| 7,312,722 B2 * | 12/2007 | Tillotson et al. ........... 340/932.2 |
| 7,355,527 B2 | 4/2008 | Franklin et al. |
| 7,516,010 B1 * | 4/2009 | Kaplan et al. ................. 701/426 |
| 7,538,690 B1 * | 5/2009 | Kaplan et al. .............. 340/932.2 |
| 7,805,239 B2 * | 9/2010 | Kaplan et al. ................. 701/426 |
| 7,825,826 B2 * | 11/2010 | Welch ........................ 340/932.2 |
| 7,834,778 B2 * | 11/2010 | Browne et al. ............. 340/932.2 |
| 7,893,847 B2 * | 2/2011 | Shanbhag et al. ......... 340/932.2 |
| 8,111,172 B2 * | 2/2012 | Morimoto et al. ......... 340/932.2 |
| 2002/0147543 A1 * | 10/2002 | Gieseke ........................ 701/200 |
| 2005/0002544 A1 * | 1/2005 | Winter et al. ................. 382/104 |
| 2005/0083212 A1 * | 4/2005 | Chew ......................... 340/932.2 |
| 2005/0256762 A1 * | 11/2005 | Dar et al. ........................ 705/13 |
| 2005/0280555 A1 * | 12/2005 | Warner ...................... 340/932.2 |
| 2006/0033641 A1 * | 2/2006 | Jaupitre et al. ............. 340/932.2 |
| 2006/0106504 A1 * | 5/2006 | Carpenter ........................ 701/1 |
| 2006/0253226 A1 | 11/2006 | Mendelson |
| 2006/0267799 A1 * | 11/2006 | Mendelson ................ 340/932.2 |
| 2007/0050240 A1 | 3/2007 | Belani et al. |

(Continued)

OTHER PUBLICATIONS

Leephakpreeda, Car-Parking Guidance with Fuzzy Knowldge-Based Decision Making, Feb. 2007, Building and Environment, vol. 42, Issue 2, pp. 803-809.*

(Continued)

*Primary Examiner* — Richard M. Camby
(74) *Attorney, Agent, or Firm* — Ishimaru & Associates LLP; Mikio Ishimura; Stanley M. Chang

(57) ABSTRACT

A method of operation of a navigation system includes: selecting a user's destination; determining an actual parking condition of an unmetered street parking space; and determining a travel path based on the actual parking condition from a user's current position to the unmetered street parking space for displaying on a device.

18 Claims, 6 Drawing Sheets

U.S. PATENT DOCUMENTS

| | | | |
|---|---|---|---|
| 2007/0069923 A1* | 3/2007 | Mendelson | 340/988 |
| 2008/0048885 A1* | 2/2008 | Quinn | 340/932.2 |
| 2009/0171563 A1* | 7/2009 | Morimoto et al. | 701/201 |
| 2009/0179776 A1* | 7/2009 | Holden | 340/932.2 |
| 2010/0007523 A1 | 1/2010 | Hatav | |
| 2010/0017118 A1* | 1/2010 | Dougherty | 701/209 |

OTHER PUBLICATIONS

International Search Report for Application No. PCT/US2011/024460 dated Apr. 6, 2011.

http://www.streetlinenetworks.com/site/pdf-factsheets/Streetline_Services.pdf, 2009, Streetline, Inc., San Francisco, US.

* cited by examiner

NAVIGATION SYSTEM WITH PARKING SPACE LOCATOR MECHANISM AND METHOD OF OPERATION THEREOF

TECHNICAL FIELD

The present invention relates generally to a navigation system, and more particularly to a system for a navigation system with a parking space locator.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Recent developments in sensor technology have allowed cost-effective parking sensors to be manufactured in large quantities. Today, this network of sensors aids users by sending real-time parking data from parking spaces to enabled devices such as navigation systems. However, parking space locator services have failed to do more than inform users of some of the available parking spaces. This failure to incorporate more information is of paramount concern to consumers.

Thus, a need still remains for a navigation system with parking space locator mechanism that can provide a user with all necessary information to effectively choose and find a parking space. In view of the diminishing space in cities and the increasing cost of parking, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: selecting a user's destination; determining an actual parking condition of an unmetered street parking space; and determining a travel path based on the actual parking condition from a user's current position to the unmetered street parking space for displaying on a device.

The present invention provides a navigation system, including: a control unit for selecting a user's destination; a parking space module, coupled to the control unit, for determining an actual parking condition of an unmetered street parking space; and a path module, coupled to the parking space module, for determining a travel path based on the actual parking condition from a user's current position to the unmetered street parking space, the travel path for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
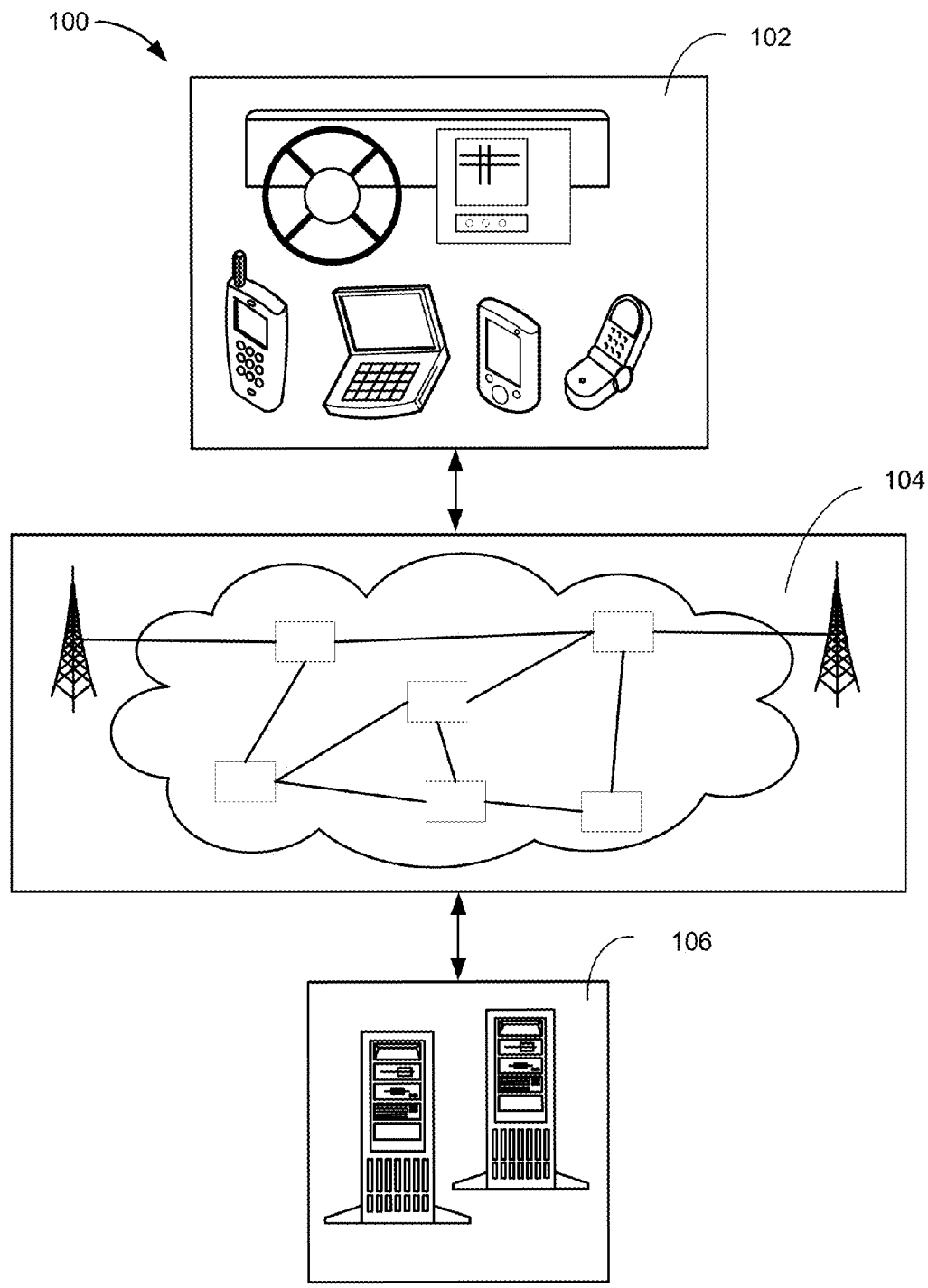
FIG. 1 is a navigation system with parking space locator mechanism in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with parking space locator mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
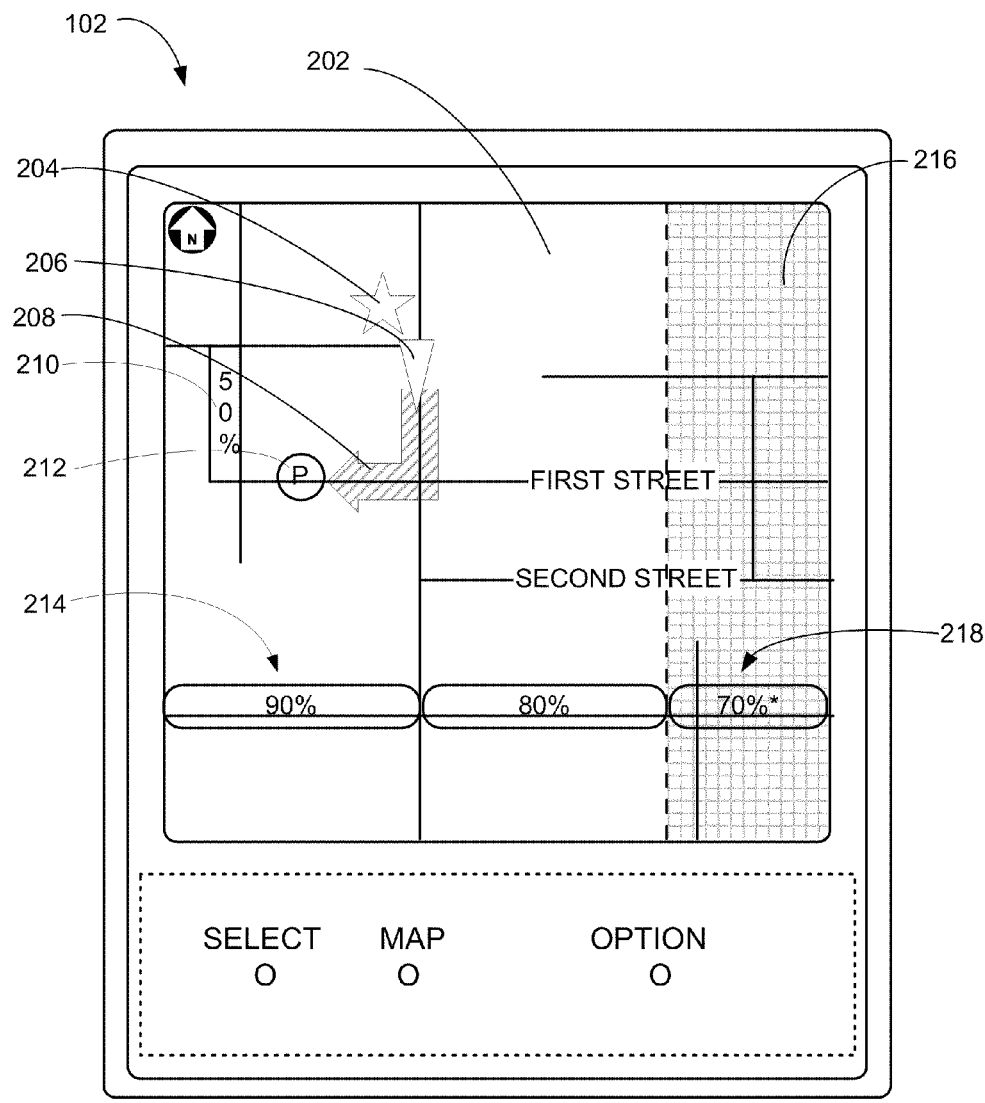
FIG. 2 is a display interface of the first device.

Referring now to FIG. 2, therein is shown a display interface 202 of the first device 102. The display interface 202 can depict a user's destination 204, a user's current position 206, a travel path 208, an unmetered street parking space 210, a suggested parking space 212, an actual parking condition 214, an un-sensored street parking space 216, and an estimated parking condition 218.

The user's destination 204 is defined as the automatically or manually selected destination input to the navigation system 100. For example, the user's destination 204 can be a specific address, a building complex, or other location. The user's destination 204 can be depicted by highlighting the location with a star or other unique identifier.

The user's current position 206 is defined as the current location of the user of the navigation system 100. For example, the user's current position 206 can be a specific address, a road, a building complex, or other location. The user's current position 206 can be depicted with a symbol, a marker, text, or other unique identifier.

The travel path 208 is defined as the directions to proceed from the user's current position 206 to a parking space proximate to the user's destination 204. For example, the travel path 208 can be depicted on the display interface 202 as an arrow, a line, a series of text instructions, or a combination thereof. Also for example, the travel path 208 can include a road, a walkway, a sidewalk, a side street, a highway, or some combination thereof. As a further example, the travel path 208 can be depicted on the first device 102 as audio instructions.

The unmetered street parking space 210 is defined as many different types of on-street parking spaces where payment is not required. The unmetered street parking space 210 is also defined as on-street parking spaces limited in some way. For example, the unmetered street parking space 210 can represent a time-limited street parking space, a residential street parking space, a loading zone, or a no parking zone.

The unmetered street parking space 210 can be depicted on the display interface 202 in many different ways. For example, the unmetered street parking space 210 can be depicted as outlines of individual on-street parking spaces if the spaces are marked. The unmetered street parking space 210 can be depicted as an outline of the on-street parking spaces adjacent to one another as a whole that do not require payment.

The unmetered street parking space 210 can be labeled in many different ways. For example, the unmetered street parking space 210 can be marked with text indicating the unmetered street parking space 210 as a space with a 2 hour limit, a 20 minute limit, or any other time limit. The text used to indicate the time limit can be displayed as inside, directly alongside, or otherwise connected to the unmetered street parking space 210. Where appropriate, the unmetered street parking space 210 can be color-coded to show time limits such as green for a 20 minute limit or red for a no parking zone. Also for example, the unmetered street parking space 210 with no restrictions can be labeled with a time limit of days or hours or displayed with no restrictions indicated.

For illustrative purposes, the navigation system 100 is described with the unmetered street parking space 210 described as being depicted and labeled in specific ways, although it is understood that the unmetered street parking space 210 can be depicted and labeled in other ways. For example, the unmetered street parking space 210 can be depicted as an outline of the entire parking area that contains the unmetered street parking space 210. The unmetered street parking space 210 can be labeled with text, colors, patterns, or animations designed to draw attention to the unmetered street parking space 210. Also for example, the unmetered street parking space 210 can be depicted as an individual space for every instance of the unmetered street parking space 210.

Also for illustrative purposes, the navigation system 100 is described with the unmetered street parking space 210 as a single parking space, although it is understood that the depiction of the unmetered street parking space 210 can include more than one parking space of the type of the unmetered street parking space 210. The outline of the area where the unmetered street parking space 210 is located can include multiple instances of the unmetered street parking space 210.

The suggested parking space 212 is defined as the unmetered street parking space 210 that is selected for parking in based on the user's destination 204 and other factors. For example, the suggested parking space 212 can be determined by the distance to the user's destination 204, the proximity to walkways to the user's destination 204, the number of streets that need to be crossed to reach the user's destination 204, ease of parking in the suggested parking space 212, and other external factors for the unmetered street parking space 210 to be selected as the suggested parking space 212.

The suggested parking space 212 can be depicted in a number of ways. For example, the suggested parking space 212 can be depicted with a symbol such as a circle with the letter P in the center. The symbol for the suggested parking space 212 can be located inside, on top of, or a combination thereof the unmetered street parking space 210. Also for example, the suggested parking space 212 can be depicted by displaying the unmetered street parking space 210 on the display interface 202 as glowing, pulsating, or otherwise animating.

For illustrative purposes, the navigation system 100 is described with the suggested parking space 212 being depicted in two specific ways, although it is understood that the suggested parking space 212 can be depicted in other ways. For example, the suggested parking space 212 can be depicted indirectly with an arrow pointing to the location of the suggested parking space 212.

The actual parking condition 214 is defined as the status of the unmetered street parking space 210 with regards to whether it is occupied or empty. For example, the actual parking condition 214 can represent a motor vehicle or other types of obstacles, such as a dumpster or a road barrier, occupying a parking space. The actual parking condition 214 can represent the empty status of the unmetered street parking space 210.

The actual parking condition 214 can be depicted in different ways. For example, the actual parking condition 214 can be depicted as an outline of the area where multiple instances of the unmetered street parking space 210 are located, with a percentage of occupied spaces indicating the actual parking condition 214. The actual parking condition 214 can also be depicted with a solid rectangle for the unmetered street parking space 210 that is occupied and an outline of a rectangle for the unmetered street parking space 210 that is empty. The actual parking condition 214 can be depicted with any other appropriate shape to represent the actual parking condition 214 of a single instance of the unmetered street parking space 210.

For illustrative purposes, the navigation system 100 is described with the actual parking condition 214 described as being descriptive of individual parking spaces or of an outline of the area around multiple instances of the unmetered street parking space 210, although it is understood that the actual parking condition 214 can be depicted in other ways. For example, in addition to a percentage number depicting the actual parking condition 214 of an area around the unmetered street parking space 210, the outline around the area can be color-coded to make crowded areas easier to distinguish. Streets above 50% occupancy can be depicted with the actual parking condition 214 colored red. Streets below 50% occupancy can be depicted with the actual parking condition 214 colored green.

Also for illustrative purposes, the navigation system 100 is described with the actual parking condition 214 described as being descriptive of one instance of the unmetered street parking space 210 or the area around multiple instances of the unmetered street parking space 210, although it is understood that the actual parking condition 214 can describe any number of instances of the unmetered street parking space 210. For example, the actual parking condition can be depicted as an outline covering an entire block, multiple blocks, an automatically defined area around the user's destination 204, a user-defined area around the user's destination 204, or some other combination of multiple instances of the unmetered street parking space 210.

The un-sensored street parking space 216 is defined as an on-street parking space that does not have a way of determining the actual parking condition 214. The un-sensored street parking space 216 can be depicted on the display interface 202 in many ways. For example, the un-sensored street parking space 216 can be depicted with an outline of the area for which there is no determination of the actual parking condition 214. The un-sensored street parking space 216 can be labeled with a symbol, color, shading, or some combination thereof to indicate the lack of access to the actual parking condition 214.

The estimated parking condition 218 is defined as an estimate of the actual parking condition 214 for the un-sensored street parking space 216. For example, the estimated parking condition 218 can represent a motor vehicle occupying the un-sensored street parking space 216. The estimated parking condition 218 can represent the un-sensored street parking space 216 that is empty.

The estimated parking condition 218 can be depicted in many different ways. For example, the estimated parking condition 218 can be depicted by an outline of the area with multiple instances of the un-sensored street parking space

216. The estimated parking condition 218 can be depicted by an outline of individual instances of the un-sensored street parking space 216.

The estimated parking condition 218 can be labeled in different ways. For example, the estimated parking condition 218 can be labeled with a number indicating the number of occupied or empty spaces, labeled individually as occupied or empty, color-coded to indicate how crowded the instances of the un-sensored street parking space 216 are, or some combination thereof. Also for example, the estimated parking condition 218 can be labeled with a percentage and a symbol to distinguish the estimated parking condition 218 from the actual parking condition 214 such as an asterisk, a tilde, or a combination thereof.

Figure 3:
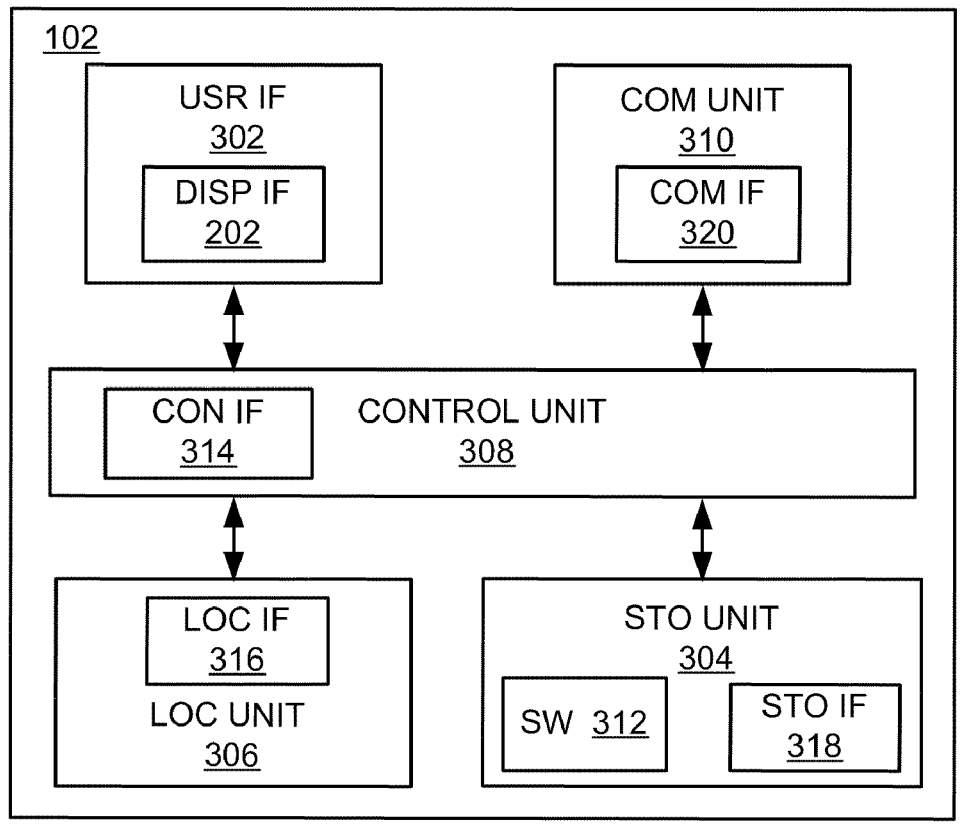
FIG. 3 is an exemplary block diagram of the first device.

Referring now to FIG. 3, therein is shown an exemplary block diagram of the first device 102. The first device 102 can include a user interface 302, a storage unit 304, a location unit 306, a control unit 308, and a communication unit 310.

The user interface 302 allows a user (not shown) to interface and interact with the first device 102. The user interface 302 can include an input device and an output device. Examples of the input device of the user interface 302 can include a keypad, a touchpad, soft-keys, a keyboard, a microphone, or any combination thereof to provide data and communication inputs. Examples of the output device of the user interface 302 can include the display interface 202. The display interface 202 can include a display, a projector, a video screen, a speaker, or any combination thereof.

The control unit 308 can execute a software 312 to provide the intelligence of the navigation system 100. The control unit 308 can operate the user interface 302 to display information generated by the navigation system 100. The control unit 308 can also execute the software 312 for the other functions of the navigation system 100, including receiving location information from the location unit 306. The control unit 308 can further execute the software 312 for interaction with the communication path 104 of FIG. 1 via the communication unit 310.

The control unit 308 can be implemented in a number of different manners. For example, the control unit 308 can be a processor, an embedded processor, a microprocessor, a hardware control logic, a hardware finite state machine (FSM), a digital signal processor (DSP), or a combination thereof.

The control unit 308 can include a controller interface 314. The controller interface 314 can be used for communication between the control unit 308 and other functional units in the first device 102. The controller interface 314 can also be used for communication that is external to the first device 102.

The controller interface 314 can receive information from the other functional units or from external sources, or can transmit information to the other functional units or to external destinations. The external sources and the external destinations refer to sources and destinations external to the first device 102.

The controller interface 314 can be implemented in different ways and can include different implementations depending on which functional units or external units are being interfaced with the controller interface 314. For example, the controller interface 314 can be implemented with a pressure sensor, an inertial sensor, a microelectromechanical system (MEMS), optical circuitry, waveguides, wireless circuitry, wireline circuitry, or a combination thereof.

The location unit 306 can generate location information, current heading, and current speed of the first device 102, as examples. The location unit 306 can be implemented in many ways. For example, the location unit 306 can function as at least a part of a global positioning system (GPS), an inertial navigation system, a cellular-tower location system, a pressure location system, or any combination thereof.

The location unit 306 can include a location interface 316. The location interface 316 can be used for communication between the location unit 306 and other functional units in the first device 102. The location interface 316 can also be used for communication that is external to the first device 102.

The location interface 316 can receive information from the other functional units or from external sources, or can transmit information to the other functional units or to external destinations. The external sources and the external destinations refer to sources and destinations external to the first device 102.

The location interface 316 can include different implementations depending on which functional units or external units are being interfaced with the location unit 306. The location interface 316 can be implemented with technologies and techniques similar to the implementation of the controller interface 314.

The storage unit 304 can store the software 312. The storage unit 304 can also store the relevant information, such as advertisements, points of interest (POI), navigation routing entries, or any combination thereof.

The storage unit 304 can be a volatile memory, a nonvolatile memory, an internal memory, an external memory, or a combination thereof. For example, the storage unit 304 can be a nonvolatile storage such as non-volatile random access memory (NVRAM), Flash memory, disk storage, or a volatile storage such as static random access memory (SRAM).

The storage unit 304 can include a storage interface 318. The storage interface 318 can be used for communication between the location unit 306 and other functional units in the first device 102. The storage interface 318 can also be used for communication that is external to the first device 102.

The storage interface 318 can receive information from the other functional units or from external sources, or can transmit information to the other functional units or to external destinations. The external sources and the external destinations refer to sources and destinations external to the first device 102.

The storage interface 318 can include different implementations depending on which functional units or external units are being interfaced with the storage unit 304. The storage interface 318 can be implemented with technologies and techniques similar to the implementation of the controller interface 314.

The communication unit 310 can enable external communication to and from the first device 102. For example, the communication unit 310 can permit the first device 102 to communicate with the second device 106 of FIG. 1, an attachment, such as a peripheral device or a computer desktop, and the communication path 104.

The communication unit 310 can also function as a communication hub allowing the first device 102 to function as part of the communication path 104 and not limited to be an end point or terminal unit to the communication path 104. The communication unit 310 can include active and passive components, such as microelectronics or an antenna, for interaction with the communication path 104.

The communication unit 310 can include a communication interface 320. The communication interface 320 can be used for communication between the communication unit 310 and other functional units in the first device 102. The communication interface 320 can receive information from the other functional units or can transmit information to the other functional units.

The communication interface 320 can include different implementations depending on which functional units are being interfaced with the communication unit 310. The communication interface 320 can be implemented with technologies and techniques similar to the implementation of the controller interface 314.

For illustrative purposes, the navigation system 100 is shown with the partition having the user interface 302, the storage unit 304, the location unit 306, the control unit 308, and the communication unit 310 although it is understood that the navigation system 100 can have a different partition. For example, the software 312 can be partitioned differently such that some or all of its function can be in the control unit 308, the location unit 306, and the communication unit 310. Also, the first device 102 can include other functional units not shown in FIG. 3 for clarity.

The functional units in the first device 102 can work individually and independently of the other functional units. The first device 102 can work individually and independently from the second device 106 and the communication path 104.

Figure 4:
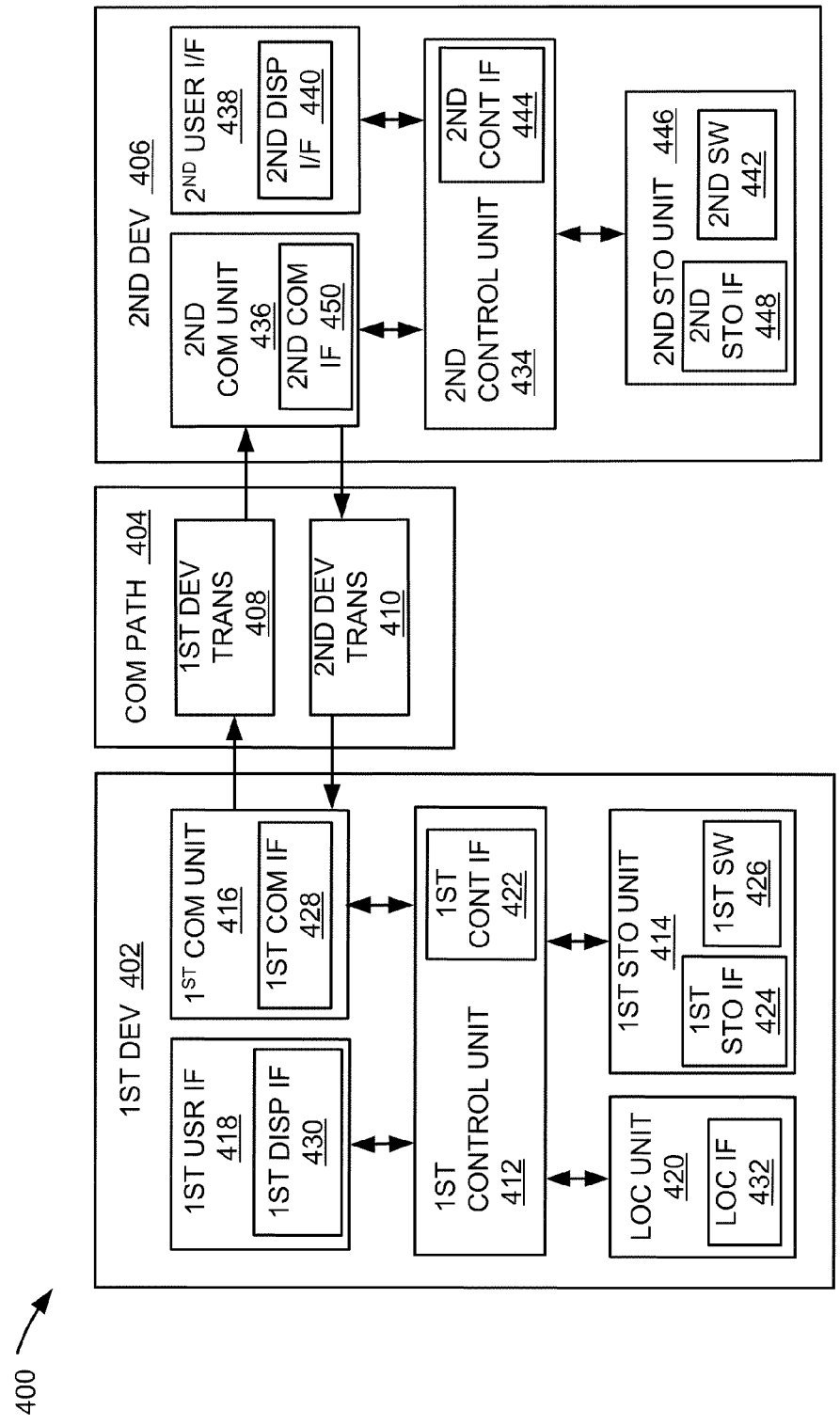
FIG. 4 is an exemplary block diagram of a navigation system with parking space locator mechanism in a second embodiment of the present invention.

Referring now to FIG. 4, therein is shown an exemplary block diagram of a navigation system 400 with parking space locator mechanism in a second embodiment of the present invention. The navigation system 400 can include a first device 402, a communication path 404, and a second device 406.

The first device 402 can communicate with the second device 406 over the communication path 404. For example, the first device 402, the communication path 404, and the second device 406 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 400.

The first device 402 can send information in a first device transmission 408 over the communication path 404 to the second device 406. The second device 406 can send information in a second device transmission 410 over the communication path 404 to the first device 402.

For illustrative purposes, the navigation system 400 is shown with the first device 402 as a client device, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client device.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, and a location unit 420. The first device 402 can be similarly described by the first device 102.

The first control unit 412 can include a first control interface 422. The first control unit 412 and the first control interface 422 can be similarly described as the control unit 308 of FIG. 3 and the controller interface 314 of FIG. 3, respectively.

The first storage unit 414 can include a first storage interface 424. The first storage unit 414 and the first storage interface 424 can be similarly described as the storage unit 304 of FIG. 3 and the storage interface 318 of FIG. 3, respectively. A first software 426 can be stored in the first storage unit 414.

The first communication unit 416 can include a first communication interface 428. The first communication unit 416 and the first communication interface 428 can be similarly described as the communication unit 310 of FIG. 3 and the communication interface 320 of FIG. 3, respectively.

The first user interface 418 can include a first display interface 430. The first user interface 418 and the first display interface 430 can be similarly described as the user interface 302 of FIG. 3 and the display interface 202 of FIG. 3, respectively.

The location unit 420 can include a location interface 432. The location unit 420 and the location interface 432 can be similarly described as the location unit 306 of FIG. 3 and the location interface 316 of FIG. 3, respectively.

The performance, architectures, and type of technologies can also differ between the first device 102 and the first device 402. For example, the first device 102 can function as a single device embodiment of the present invention and can have a higher performance than the first device 402. The first device 402 can be similarly optimized for a multiple device embodiment of the present invention.

For example, the first device 102 can have a higher performance with increased processing power in the control unit 308 compared to the first control unit 412. The storage unit 304 can provide higher storage capacity and access time compared to the first storage unit 414.

Also for example, the first device 402 can be optimized to provide increased communication performance in the first communication unit 416 compared to the communication unit 310. The first storage unit 414 can be sized smaller compared to the storage unit 304. The first software 426 can be smaller than the software 312 of FIG. 3.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows a user (not shown) to interface and interact with the second device 406. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 400. The second software 442 can operate in conjunction with the first software 426. The second control unit 434 can provide additional performance compared to the first control unit 412 or the control unit 308.

The second control unit 434 can operate the second user interface 438 to display information. The second control unit 434 can also execute the second software 442 for the other functions of the navigation system 400, including operating the second communication unit 436 to communicate with the first device 402 over the communication path 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 400 is shown with the second storage unit 446 as a single hierarchy storage system, although it is understood that the navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory (NVRAM), Flash memory, disk storage, or a volatile storage such as static random access memory (SRAM).

The second storage unit 446 can include a second storage interface 448. The second storage interface 448 can be used for communication between the location unit 306 and other functional units in the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 406. For example, the second communication unit 436 can permit the second device 406 to communicate with the first device 402 over the communication path 404.

The second communication unit 436 can also function as a communication hub allowing the second device 406 to function as part of the communication path 404 and not limited to be an end point or terminal unit to the communication path 404. The second communication unit 436 can include active and passive components, such as microelectronics or an antenna, for interaction with the communication path 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 404 to send information to the second device 406 in the first device transmission 408. The second device 406 can receive information in the second communication unit 436 from the first device transmission 408 of the communication path 404.

The second communication unit 436 can couple with the communication path 404 to send information to the first device 402 in the second device transmission 410. The first device 402 can receive information in the first communication unit 416 from the second device transmission 410 of the communication path 404. The navigation system 400 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication path 404.

The functional units in the second device 406 can work individually and independently of the other functional units. The second device 406 can work individually and independently from the first device 402 and the communication path 404.

For illustrative purposes, the navigation system 400 is described by operation of the first device 402 and the second device 406. It is understood that the first device 402 and the second device 406 can operate any of the modules and functions of the navigation system 400. For example, the first device 402 is described to operate the location unit 420, although it is understood that the second device 406 can also operate the location unit 420.

Figure 5:
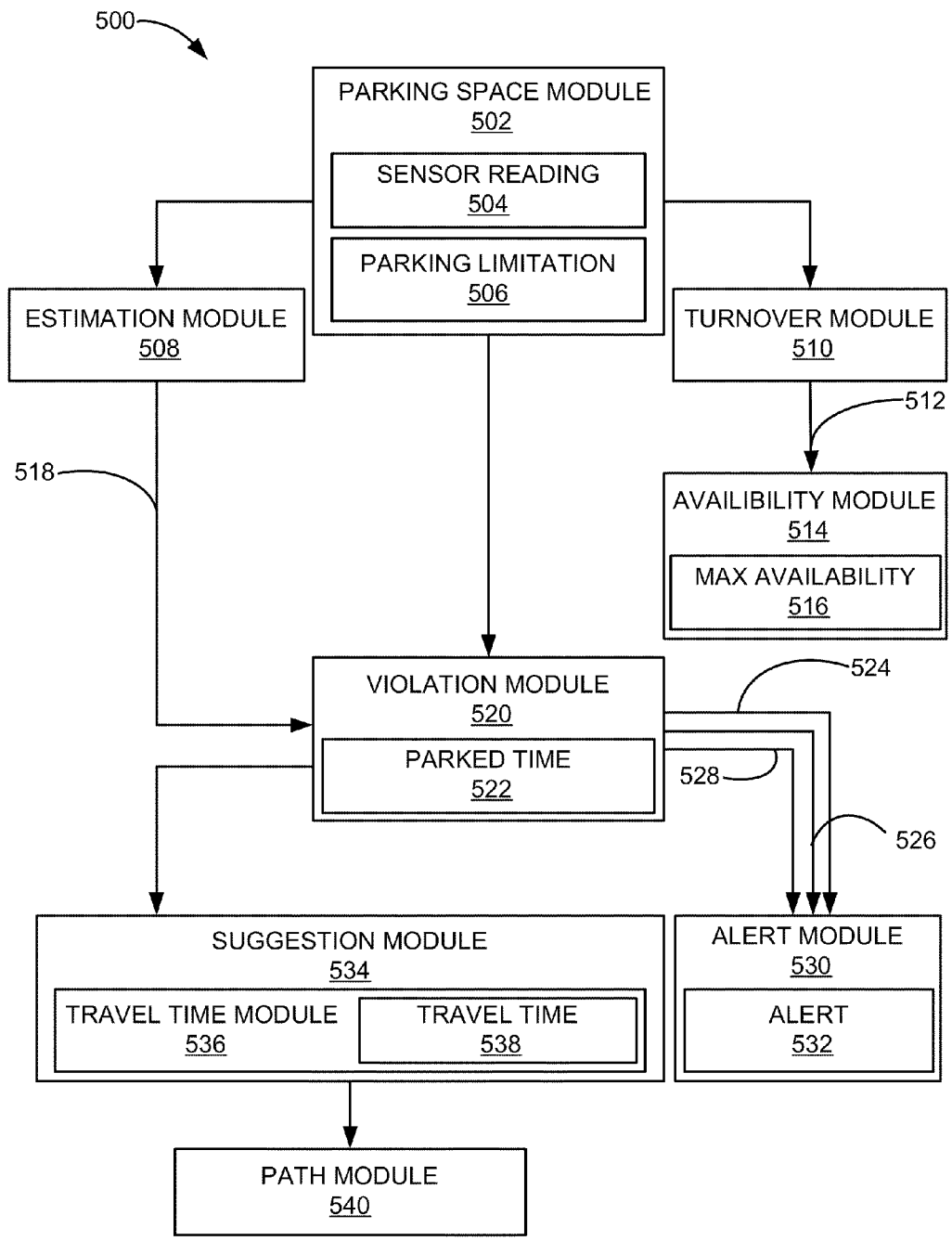
FIG. 5 is a navigation system with parking space locator mechanism in a third embodiment of the present invention.

Referring now to FIG. 5, therein is shown a navigation system 500 with parking space locator mechanism in a third embodiment of the present invention. The navigation system 500 can have inputs into one module be available to the other modules as described in the examples below without requiring explicit figure labeling for clarity.

The navigation system 500 can include a parking space module 502. The parking space module 502 determines the actual parking condition 214 of FIG. 2 and restrictions on parking of different types of street parking spaces. For example, the parking space module 502 can receive a monitoring device reading 504 from the unmetered street parking space 210 of FIG. 2 to determine the actual parking condition 214. Also for example, the parking space module 502 can also determine restrictions on parking in the unmetered street parking space 210 from the monitoring device reading 504 or with downloaded or pre-loaded information. As a further example, the parking space module 502 can determine restrictions on parking in the un-sensored street parking space 216 of FIG. 2 with the monitoring device reading 504 or downloaded or pre-loaded information.

The monitoring device reading 504 is defined as a transmission received from any device that can detect the presence of a motor vehicle, such as a magnetometer, an ultrasonic detector, an inductive loop, a pressure sensor, or a camera that is used to determine the actual parking condition 214 of the unmetered street parking space 210. For example, the monitoring device reading 504 can be used to determine whether the actual parking condition 214 is occupied or empty. The monitoring device reading 504 can be transmitted via wired or wireless methods at intervals such as once per hour, once per minute, once per second, multiple times per second, or a similar interval.

For illustrative purposes, the navigation system 500 is described with the monitoring device reading 504 described as being used to determine the actual parking condition 214 of a single instance of the unmetered street parking space 210, although it is understood that the monitoring device reading 504 can be used to determine the actual parking condition 214 of more than one instance of the unmetered street parking space 210. For example, if the monitoring device reading 504 is from a camera that can see a half-block, the monitoring device reading 504 can be used to determine the actual parking condition 214 of all instances of the unmetered street parking space 210 within that half-block.

A parking limitation 506 is defined as restrictions on parking in the unmetered street parking space 210 or the un-sensored street parking space 216. For example, the parking limitation 506 can represent the enforced hours, an allowed parking time, a loading zone, a no parking zone, nearby fire hydrants, or special conditions such as construction or parades. The parking limitation 506 can also represent whether the unmetered street parking space 210 or the un-sensored street parking space 216 requires the user to pull in head-first or to parallel park.

The parking limitation 506 can be determined by the parking space module 502. For example, the parking space module 502 can determine the parking limitation 506 via the monitoring device reading 504, a database containing the parking limitation 506 of the parking spaces in question, a pre-generated map with the unmetered street parking space 210 or the un-sensored street parking space 216 labeled with the parking limitation 506, or a combination thereof.

The un-sensored street parking space 216 can be determined by the parking space module 502 in different ways. For example, the parking space module 502 can determine areas with on-street parking that do not have associated with them the monitoring device reading 504 as the un-sensored street parking space 216. Also for example, the location of the un-sensored street parking space 216 can be determined by loading a map with the un-sensored street parking space 216 already determined into the parking space module 502.

For illustrative purposes, the navigation system 500 is described with the parking space module 502 described as determining a single instance of the un-sensored street parking space 216, although it is understood that the parking space module 502 can determine more than one instance of the un-sensored street parking space 216. For example, the parking space module 502 can determine every instance of the un-sensored street parking space 216 within a 10-minute radius of the user's destination 204 at walking speed.

Also for illustrative purposes, the navigation system 500 is described with the parking space module 502 described as determining the actual parking condition 214 for the unmetered street parking space 210 once, although it is understood that the parking space module 502 can determine the actual parking condition 214 more than once. For example, the parking space module 502 can determine the actual parking condition 214 with real-time updates or interval updates, such as once per second, once per minute, or another time interval.

Also for illustrative purposes, the navigation system 500 is described with the parking space module 502 described as determining the actual parking condition 214 of a single instance of the unmetered street parking space 210 or at most a half-block with instances of the unmetered street parking space 210, although it is understood that the parking space module 502 can determine the actual parking condition 214 for more instances of the unmetered street parking space 210. For example, the parking space module 502 can determine the actual parking condition 214 for all instances of the unmetered street parking space 210 around the user's destination 204, a user-selected location, or an automatically generated location. The parking space module 502 can determine the actual parking condition 214 of any number of instances of the unmetered street parking space 210 such as ten instances, one hundred instances, one thousand instances, ten thousand instances, or more.

It has been discovered that the present invention provides the navigation system 500 with the capability to determine the actual parking condition 214 and the parking limitation 506 of the unmetered street parking space 210. It has also been discovered that the present invention provides the navigation system 500 with the capability to determine the parking limitation 506 of the un-sensored street parking space 216. The parking space module 502 provides the navigation system 500 with the ability to use the monitoring device reading 504 or other externally-determined information to determine the parking limitation 506 of the unmetered street parking space 210. As an example, the externally-determined information can be a map with the parking limitation 506 already determined or a map linked to a database with locations of the parking limitation 506. The parking space module 502 also provides the navigation system 500 with the ability to use the monitoring device reading 504 to determine the actual parking condition 214 of the unmetered street parking space 210 in real-time.

The physical transformation of the actual parking condition 214 results in movement in the physical world, such as people using the display interface 202 or vehicles, based on the operation of the navigation system 500. As the movement in the physical world occurs, the actual parking condition 214 is continually updated which results in a change in the movement in the physical world, such as people using the navigation system 500 changing course to a newly vacated parking space.

The navigation system 500 can also include a turnover module 510, coupled to the parking space module 502. The turnover module 510 calculates a turnover rate 512 based on the actual parking condition 214 for a particular area. The area can be defined as a single parking space, single or multiple blocks, a district of a municipality such as downtown, or an area centered on the user's destination 204 of an arbitrary size. For example, for a three-block area around the user's destination 204, the turnover module 510 can receive the actual parking condition 214 from the parking space module 502 at regular intervals such as once per second, once per minute, once per hour, or a combination thereof. The turnover module 510 can then use the actual parking condition 214 for each instance of the unmetered street parking space 210 within the three-block area around the user's destination 204 to calculate the turnover rate 512 for the area.

The turnover module 510 can record how often the actual parking condition 214 changes from occupied to empty and then back again, the length of time the actual parking condition 214 is empty, the length of time the actual parking condition 214 is occupied, or some combination thereof. The turnover module 510 can use this recorded information in order to calculate the turnover rate 512.

The turnover rate 512 is defined as the frequency at which any given space type of the unmetered street parking space 210 is occupied and vacated. For example, the turnover rate 512 can be a number such as 3 cars per hour, 5 cars per day, 20 minutes between cars, or a combination thereof. The turnover rate 512 can be calculated by the turnover module 510 at varying intervals such as 6 times per hour, once per hour, four times a day, upon a change, or a combination thereof.

For illustrative purposes, the navigation system 500 is described with the turnover module 510 described as calculating the turnover rate 512 for a defined area, although it is understood that the turnover module 510 can also calculate the turnover rate 512 for a single instance of the unmetered street parking space 210. Also for illustrative purposes, the turnover rate 512 is described as being represented by a single number, although it is understood that the turnover rate 512 can comprise multiple numbers. For example, the turnover rate 512 can be the number of cars per hour that occupy the unmetered street parking space 210, the average length of time the cars occupy the unmetered street parking space 210, and the average length of time the actual parking condition 214 of the unmetered street parking space 210 is empty.

The navigation system 500 can also include an availability module 514, coupled to the turnover module 510. The availability module 514 estimates a maximum availability time 516 of the unmetered street parking space 210 using the turnover rate 512. For example, the availability module 514 can estimate the maximum availability time 516 to be the time when the turnover rate 512 indicates a peak in the rate that cars are moving in and out of the unmetered street parking space 210. The availability module 514 can also estimate the maximum availability time 516 to be when the turnover rate 512 indicates that the average time the unmetered street parking space 210 is empty has reached a peak.

The maximum availability time 516 is defined as the time of day during which the unmetered street parking space 210 is easiest to park in or most likely available or empty. For example, if the turnover rate 512 indicates that the unmetered street parking space 210 is empty on average for 30 minutes of the hour, that hour may be estimated as the maximum availability time 516. The maximum availability time 516 can be estimated at time intervals such as four times an hour, once per hour, once per day, time slots per day, or some combination thereof.

For illustrative purposes, the navigation system 500 is described with the availability module 514 described as estimating the maximum availability time 516 for a single instance of the unmetered street parking space 210, although it is understood that the maximum availability time 516 can be estimated for more than one instance of the unmetered street parking space 210. For example, the availability module 514 can estimate the maximum availability time 516 of an entire block, multiple blocks, a user-defined area, an automatically defined area, or some combination thereof.

The navigation system 500 can include an estimation module 508, coupled to the parking space module 502. The estimation module 508 estimates a future parking condition 518 for the unmetered street parking space 210 and can extrapolate the estimated parking condition 218 of FIG. 2 for the un-sensored street parking space 216.

The future parking condition 518 is defined as an estimate of the actual parking condition 214 for the unmetered street parking space 210 at a future time. For example, the future parking condition 518 can be an estimate of the actual parking condition 214 10 minutes in the future, 1 hour in the future, 1 day in the future, the end of the working day, the start of a holiday, some time before an event, or a combination thereof.

The estimation module 508 can estimate the future parking condition 518 for the unmetered street parking space 210 via different methods. For example, the estimation module 508 can receive the actual parking condition 214 to estimate when the future parking condition 518 will be empty by comparing the time of day to the actual parking condition 214 over time. Also for example, the estimation module 508 can estimate when the future parking condition 518 will be empty by looking at the turnover rate 512 and when it appears likely that the actual parking condition 214 would be empty at some point in the future.

The estimation module 508 can extrapolate the estimated parking condition 218 for the un-sensored street parking space 216 using the actual parking condition 214 via different methods. For example, the estimation module 508 can receive the actual parking condition 214 from the monitoring device reading 504 of the unmetered street parking space 210 proximate to the un-sensored street parking space 216. The unmetered street parking space 210 proximate to the un-sensored street parking space 216 can be within one or two blocks, within 50 meters, or a combination thereof.

The estimation module 508 can determine trends in the actual parking condition 214 as it changes based on the distance to the un-sensored street parking space 216 to extrapolate the estimated parking condition 218 for the un-sensored street parking space 216. For example, if there is a downward trend in the actual parking condition 214 of the unmetered street parking space 210 as the spaces get farther from a popular destination, such as a movie theater or a sports arena, the estimated parking condition 218 can be extrapolated from the actual parking condition 214 to follow the same trend and the estimated parking condition 218 can be extrapolated as being yet lower.

For illustrative purposes, the navigation system 500 is described with the estimation module 508 described as extrapolating the estimated parking condition 218 of a single instance of the un-sensored street parking space 216, although it is understood that the estimation module 508 can extrapolate the estimated parking condition 218 of more than one instance of the un-sensored street parking space 216. For example, the estimation module 508 can extrapolate the estimated parking condition 218 of multiple instances of the un-sensored street parking space 216 that lie within a user-defined or automatically defined area such as four square blocks. The estimation module 508 can extrapolate the estimated parking condition 218 using a number of separate regions of the un-sensored street parking space 216.

Also for illustrative purposes, the navigation system 500 is described with the estimation module 508 described as extrapolating the estimated parking condition 218 based on a single trend of changes of multiple instances of the actual parking condition 214. Although it is understood that the estimation module 508 can account for multiple trends within, for example, 200 meters of the un-sensored street parking space 216 in order to extrapolate the estimated parking condition 218.

For example, the estimation module 508 can increase the accuracy of the estimated parking condition 218 by using trends of the actual parking condition 214 on two sides of the un-sensored street parking space 216. If the estimation module 508 receives the actual parking condition 214 for instances of the unmetered street parking space 210 on either side of the un-sensored street parking space 216 and the trend in the actual parking condition 214 continues on a downward trend, the estimation module 508 can estimate with good accuracy that the estimated parking condition 218 will fit within the trend in the actual parking condition 214.

It has been discovered that the present invention provides the navigation system 500 with the ability to estimate the actual parking condition 214 of the un-sensored street parking space 216 based on the actual parking condition 214 of the unmetered street parking space 210 proximate to the un-sensored street parking space 216. The estimation module 508 provides the navigation system 500 with the ability to estimate the future parking condition 518 to determine when the unmetered street parking space 210 will be empty in the future.

The physical transformation of the future parking condition 518 results in movement in the physical world, such as people using the display interface 202 or vehicles, based on the operation of the navigation system 500. As the movement in the physical world occurs, the future parking condition 518 is updated which results in a change in the movement in the physical world, such as people using the navigation system 500 changing course to the unmetered street parking space 210 predicted to be empty in the future by the future parking condition 518.

It has also been discovered that the present invention provides the navigation system 500 with the ability to extrapolate the actual parking condition 214 of the un-sensored street parking space 216 in spite of a lack of access to the monitoring device reading 504. The estimation module 508 can extrapolate the estimated parking condition 218 for the un-sensored street parking space 216. The estimation module 508 provides the navigation system 500 with the ability to use the actual parking condition 214 of nearby parking spaces to extrapolate the likely condition of the un-sensored street parking space 216.

The physical transformation of the estimated parking condition 218 results in movement in the physical world, such as people using the display interface 202 or vehicles, based on the operation of the navigation system 500. As the movement in the physical world occurs, the estimated parking condition 218 is updated which results in a change in the movement in the physical world, such as people using the navigation system 500 changing course to the un-sensored street parking space 216 extrapolated to be empty by the estimated parking condition 218.

The navigation system 500 can also include a violation module 520, coupled to the parking space module 502. The violation module 520 determines a parking violation 524 and a future violation 526 for the unmetered street parking space 210 and an estimated violation 528 for the un-sensored street parking space 216.

The parking violation 524 is defined as an inconsistency of the actual parking condition 214 with the parking limitation 506 for the unmetered street parking space 210. For example, the parking violation 524 can be a motor vehicle parked in a no parking zone, in a construction zone, in a 20 minute parking space for longer than 20 minutes, in a loading zone for longer than 5 minutes, or other violation of the parking limitation 506.

The future violation 526 is defined as an inconsistency of the actual parking condition 214 with the parking limitation 506 at a future time for the unmetered street parking space 210. For example, the future violation 526 can be a motor vehicle parked in a 20 minute parking space for 15 minutes, in a 2 hour parking space for 1 hour and 50 minutes, in a parking space that will become a no parking zone due to street cleaning after 15 minutes pass, in a parking space that will become a no parking zone due to schedule construction after 10 minutes pass, or other future violation of the parking limitation 506.

The estimated violation 528 is defined as an estimated inconsistency of the estimated parking condition 218 with the parking limitation 506 for the un-sensored street parking space 216. For example, the estimated violation 528 can be an estimation that a motor vehicle is parked in a no parking zone, in a construction zone, in a 20 minute parking space for longer than 20 minutes, in a loading zone for longer than 5 minutes, or other violation of the parking limitation 506.

The violation module 520 can determine the parking violation 524 via different methods. The violation module 520 can use the actual parking condition 214 and the parking limitation 506 of the unmetered street parking space 210 to determine the parking violation 524 exists. For example, if the parking limitation 506 indicates that there is no parking allowed in the unmetered street parking space 210, but the actual parking condition 214 indicates that there is a vehicle parked in the unmetered street parking space 210, the violation module 520 can determine the parking violation 524 exists. Also for example, if the parking limitation 506 indicates that the unmetered street parking space 210 only allows parking between certain times of day and the actual parking condition 214 is occupied outside of those times of day, the violation module 520 can determine the parking violation 524 exists.

The violation module 520 can also use a parked time 522 to determine the parking violation 524 exists. The parked time 522 is defined as the elapsed time the actual parking condition 214 indicates that a single motor vehicle has been parked in the unmetered street parking space 210. For example, if the parking limitation 506 is 2 hour parking maximum, and the parked time 522 is 2 hours and 10 minutes, the violation module 520 can determine the parking violation 524 exists.

The violation module 520 can determine the future violation 526 via different methods. The future violation 526 can be determined using the actual parking condition 214, the time of day, the parking limitation 506, and the parked time 522. For example, the violation module 520 can determine the future violation 526 by comparing the parked time 522 to the parking limitation 506 and determining the future violation 526 if the parked time 522 will exceed the parking limitation 506 in the near future such as 10 minutes, 15 minutes, or other time in the future. Also for example, if the actual parking condition 214 indicates that the unmetered street parking space 210 is occupied during a time of day that is within, for example, 15 minutes of being inconsistent with the parking limitation 506, the violation module 520 can determine the future violation 526 exists.

The violation module 520 can determine the estimated violation 528 via different methods. Since the un-sensored street parking space 216 does not have the actual parking condition 214 associated with it, the estimated parking condition 218 and the parking limitation 506 of the un-sensored street parking space 216 can be used to determine whether the estimated violation 528 exists. For example, if the estimated parking condition 218 indicates that it is likely that a vehicle is parked longer than the parking limitation 506 allows, the violation module 520 can determine the estimated violation 528 exists.

It has been discovered that the present invention provides the navigation system 500 having the violation module 520 the function to estimate a parking violation in parking spaces lacking the monitoring device reading 504. The estimated violation 528 can alert authorities of possible parking violations in areas ordinarily not well covered by traditional methods.

The physical transformation of the estimated violation 528 results in movement in the physical world, such as people using the display interface 202 or vehicles moving before potential parking citations for parking violations are issued, based on the operation of the navigation system 500. As the movement in the physical world occurs such as fewer violations or moving vehicles before a violation occurs, the movement itself creates additional information that is converted back to the estimated violation 528, such as the reduction of parking violations or continued issuance of parking citations, for the continued operation of the navigation system 500 and to continue the movement in the physical world.

The navigation system 500 can also include an alert module 530, coupled to the violation module 520. The alert module 530 generates an alert 532 based on the parking violation 524, the estimated violation 528, the future violation 526, and the future parking condition 518 as empty.

The alert 532 is defined as a notice that the parking violation 524, the estimated violation 528, or the future violation 526 has occurred, or that the future parking condition 518 is indicated as empty. For example, the alert 532 can be a text message, audible alarm, visual alarm, tactile alarm such as vibration, a communication, or a combination thereof. The alert 532 can be transmitted, broadcasted, or otherwise sent to parking authorities, governmental authorities, the user of the navigation system 500, or a combination thereof.

The navigation system 500 can also include a suggestion module 534, coupled to the violation module 520. The suggestion module 534 determines the suggested parking space 212 of FIG. 2 based on the actual parking condition 214, the parking limitation 506, and a travel time 538. The suggestion module 534 can include a travel time module 536. The travel time module 536 calculates the travel time 538.

The travel time 538 is defined as the amount of time it takes to travel between the user's destination 204 and the unmetered street parking space 210. For example, the travel time 538 can represent the amount of time it takes to walk between the user's destination 204 and the unmetered street parking space 210 when taking into account surrounding conditions such as traffic lights, walkways, and the time of day.

The suggested parking space 212 can be determined with many different factors. For example, in order to determine the suggested parking space 212, the suggestion module 534 can select the unmetered street parking space 210 that has the actual parking condition 214 as empty and the parking limitation 506 as allowing parking based on the time of day. The suggestion module 534 can select the unmetered street parking space 210 with the travel time 538 as less than 10 minutes. The suggestion module 534 can determine the suggested parking space 212 by selecting the unmetered street parking space 210 with the actual parking condition 214 as empty, the parking limitation 506 as allowing parking, and the travel time 538 as short as possible.

For illustrative purposes, the navigation system 500 is described with the suggestion module 534 described as determining the suggested parking space 212 based on the travel time as less than 10 minutes, although it is understood that the maximum that the travel time 538 can be while still being selected as the suggested parking space 212 is not fixed. For example, the maximum that the travel time 538 can be can be user-selected, automatically selected, or a combination thereof.

Also for illustrative purposes, the navigation system 500 is described with the suggestion module 534 described as determining the suggested parking space 212 based on the parking limitation 506 simply allowing parking at one specific time, although it is understood that the suggestion module 534 can use the parking limitation 506 in other ways. For example, the suggestion module 534 can select the unmetered street parking space 210 that has the parking limitation 506 that allows parking for the next two hours or more.

The suggestion module 534 can include the travel time module 536. The travel time module 536 can calculate the travel time 538 with different methods. For example, the travel time 538 can be calculated by taking into account the distance between the user's destination 204 and the unmetered street parking space 210 and the surrounding conditions such as traffic lights, available walkways and sidewalks, and the time of day. Traffic lights can increase the calculation of the travel time 538. Also for example, the straight-line distance between the user's destination 204 and the unmetered street parking space 210 can be weighted less heavily when calculating the travel time 538 and the distance on sidewalks and other walkways between the user's destination 204 and the unmetered street parking space 210 can be weighted more heavily.

For illustrative purposes, the navigation system 500 is described with the travel time module 536 described as calculating the travel time 538 with specific factors, although it is understood that the travel time module 536 can calculate the travel time 538 with more than those factors. For example, the travel time module 536 can also take into account factors such as population density, the popularity of the user's destination 204, construction, or special events around the user's destination 204.

The navigation system 500 can also include a path module 540, coupled to the suggestion module 534. The path module 540 determines the travel path 208 of FIG. 2 with many different methods. For example, the path module 540 can choose the shortest route to the unmetered street parking space 210 or the suggested parking space 212, the fastest route by time, the route that passes through the fewest traffic lights, or some combination thereof.

Thus, it has been discovered that the navigation system of the present invention furnishes important and heretofore unknown and unavailable solutions, capabilities, and functional aspects for locating unmetered and un-sensored parking spaces, determining the parking condition, and determining a travel path to the parking space.

The parking space module 502 can be implemented by the navigation system 100 of FIG. 1. The parking space module 502 can be implemented with the control unit 308 of FIG. 3 and can make use of the communication unit 310 of FIG. 3, the location unit 306 of FIG. 3, the storage unit 304 of FIG. 3, or a combination thereof. For example, the parking space module 502 can use the communication unit 310 to receive the monitoring device reading 504 and the parking limitation 506. The parking space module 502 can determine the location of the unmetered street parking space 210 relative to the navigation system 100 with the location unit 306, and can store the received locations in the storage unit 304. The parking space module 502 can utilize the control unit 308 to determine the actual parking condition 214 and the parking limitation 506 for the unmetered street parking space 210.

For illustrative purposes, the navigation system 100 is described as operating as a single device, although it is understood that the operating units can be distributed in different configurations such as a client-server relationship or across multiple operating units. For example, on the client side, the parking space module 502 can utilize the location unit 306 to determine the location of the unmetered street parking space 210 for transmission to the control unit 308 on the server side. The server side can utilize the communication unit 310 to receive the monitoring device reading 504 and the parking limitation 506 linked to the unmetered street parking space 210 to send to the control unit 308. The control unit 308 can determine the actual parking condition 214 for the unmetered street parking space 210. The control unit 308 can transmit the information back to the client side for display on the display interface 202.

The turnover module 510 can be implemented by the navigation system 100. The turnover module 510 can be implemented with the control unit 308. For example, the control unit 308 can use the storage unit 304 to store the actual parking condition 214 over time, and the control unit 308 can use the stored information to determine the turnover rate 512.

The availability module 514 can be implemented by the navigation system 100. The availability module 514 can be implemented with the control unit 308 and the storage unit 304. For example, the control unit 308 can store the actual parking condition 214 and the turnover rate 512 in the storage unit 304 and use the stored values to estimate the maximum availability time 516 of the unmetered street parking space 210.

The estimation module 508 can be implemented by the navigation system 100. The estimation module 508 can be implemented with the control unit 308, the storage unit 304, or a combination thereof. For example, the control unit 308 can store the actual parking condition 214 and the turnover rate 512 in the storage unit 304, and use the stored values to estimate the future parking condition 518 of the unmetered street parking space 210. Also for example, the control unit 308 can store the actual parking condition 214 in the storage unit 304 to determine a trend in the actual parking condition 214 over multiple instances of the unmetered street parking space. The control unit 308 can use the determined trend to extrapolate the estimated parking condition 218 for the unsensored street parking space 216.

The violation module 520 can be implemented by the navigation system 100. The violation module 520 can be implemented with the control unit 308, the communication unit 310, the storage unit 304, or a combination thereof. For example, the control unit 308 can receive the parking limitation 506 directly or through the communication unit 310, and store the parking limitation 506 in the storage unit 304. The control unit 308 can compare the parking limitation 506 that has been stored in the storage unit 304 with the actual parking condition 214 or the estimated parking condition 218 to determine if any inconsistencies exist which would indicate the parking violation 524 or the estimated violation 528.

The alert module 530 can be implemented by the navigation system 100. The alert module 530 can be implemented with the control unit 308, the communication unit 310, the user interface 302 of FIG. 3, the display interface 202, or a combination thereof. For example, the control unit 308 can send the alert 532 through the communication unit 310, send the alert 532 for display to the display interface 202, send the alert 532 through the user interface 302, or a combination thereof.

The suggestion module 534 can be implemented by the navigation system 100. The suggestion module 534 can be implemented with the control unit 308, the storage unit 304, or a combination thereof. For example, the control unit 308 can store the actual parking condition 214, the parking limitation 506, and the travel time 538 in the storage unit 304 and use the stored values to determine the suggested parking space 212.

The travel time module 536 can be implemented by the navigation system 100. The travel time module 536 can be implemented with the control unit 308, the communication unit 310, the location unit 306, the storage unit 304, or a combination thereof. For example, the control unit 308 can receive the locations of the unmetered street parking space 210 and the user's destination 204 through the location unit 306, and store the values in the storage unit 304. The control unit 308 can then receive relevant information about the area between the unmetered street parking space 210 and the user's destination 204 through the communication unit 310 and store the information in the storage unit 304. The control unit 308 can then take all the stored information and use it to determine the suggested parking space 212.

The path module 540 can be implemented by the navigation system 100. The path module 540 can be implemented with the control unit 308, the location unit 306, or a combination thereof. For example, the control unit 308 can determine the current location and the location of the destination through the location unit 306 and then determine the travel path 208 to the destination.

The parking space module 502 can also be implemented by the first control unit 412 of FIG. 4. For example, the first control unit 412 can receive the monitoring device reading 504 and the parking limitation 506 through the first communication unit 416 of FIG. 4 to determine the actual parking condition 214. As a further example, the second control unit 434 of FIG. 4 can send location information for the unsensored street parking space 216 from the second storage unit 446 of FIG. 4 through the second communication unit 436 of FIG. 4 to the first communication unit 416 for the use of the first control unit 412.

The turnover module 510 can be implemented by the first control unit 412. For example, the first control unit 412 can store the actual parking condition 214 in the first storage unit 414 of FIG. 4 and use the stored information to calculate the turnover rate 512.

The availability module 514 can be implemented by the second control unit 434. For example, the second control unit 434 can receive the actual parking condition 214 and the turnover rate 512 through the second communication unit 436 and store the actual parking condition 214 and the turnover rate 512 in the second storage unit 446. The second control unit 434 can then use the stored values to estimate the maximum availability time 516.

The violation module 520 can be implemented by the second control unit 434. For example, the second control unit 434 can receive the actual parking condition 214 and the estimated parking condition 218 through the second communication unit 436 to store in the second storage unit 446. The second control unit 434 can use the actual parking condition 214, the estimated parking condition 218, and the parking limitation 506 to determine the parking violation 524 and the estimated violation 528.

The alert module 530 can be implemented by the second control unit 434. For example, the second control unit 434 can use the parking violation 524 to generate the alert 532 and transmit the alert 532 through the second communication unit 436.

The suggestion module 534 can be implemented by the second control unit 434, the second communication unit 436, the second storage unit 446, the first communication unit 416, the first control unit 412, the first display interface 430, or a combination thereof. For example, the second control unit 434 can receive the travel time 538, the parking limitation 506 and the actual parking condition 214 to store in the second storage unit 446. The second control unit 434 can determine the suggested parking space 212 with the stored information, and transmit the suggested parking space 212 through the second communication unit 436 and the first communication unit 416 to the first control unit 412. The first control unit 412 can display the suggested parking space 212 on the first display interface 430.

The travel time module 536 can be implemented by the first control unit 412, the first storage unit 414, the first communication unit 416, the location unit 420, the location interface 432, or a combination thereof. For example, the location unit 420 can determine the location of the user's destination 204 and the unmetered street parking space 210. The location unit 420 can send the location information through the location interface 432 to the first control unit 412. The first control unit 412 can store the location information in the first storage unit 414. As a further example, the first control unit 412 can receive information about the area around the unmetered street parking space 210 and the user's destination 204 to store in the first storage unit 414. The first control unit 412 can use the information in the first storage unit 414 to calculate the travel time 538 between the unmetered street parking space 210 and the user's destination 204.

The path module 540 can be implemented by the first control unit 412, the location unit 420, the location interface 432, or a combination thereof. For example, the location unit 420 can determine the location of the suggested parking space 212 and the current location of the navigation system 100. The location unit 420 can transmit the locations through the location interface 432 to the first control unit 412. The first control unit 412 can determine the travel path 208 with the location information.

The navigation system 500 can be partitioned between the first device 402 of FIG. 4 and the second device 406 of FIG. 4. For example, the navigation system 500 can be partitioned into the functional units of the first device 402, the second device 406, or a combination thereof. The navigation system 500 can also be implemented as additional functional units in the first device 102 of FIG. 1, the first device 402, the second device 406, or a combination thereof.

The navigation system 500 describes the module functions or order as an example. The modules can be partitioned differently. For example, the availability module 514 can be implemented by the first control unit 412 instead of the second control unit 434. Each of the modules can operate individually and independently of the other modules.

Figure 6:
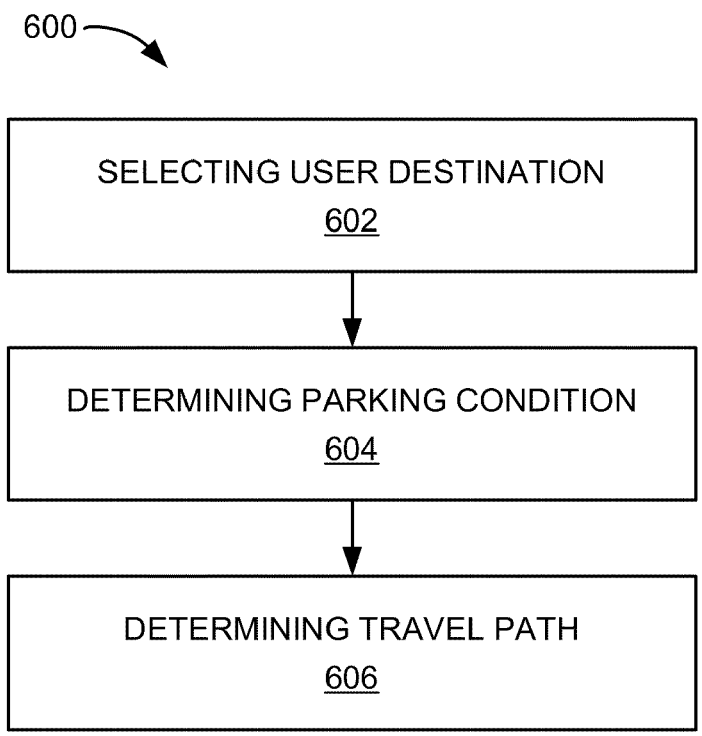
FIG. 6 is a flow chart of a method of operation of a navigation system in a further embodiment of the present invention.

Referring now to FIG. 6, therein is shown a flow chart of a method 600 of operation of a navigation system in a further embodiment of the present invention. The method 600 includes: selecting a user's destination in a block 602; determining an actual parking condition of an unmetered street parking space in a block 604; and determining a travel path based on the actual parking condition from a user's current position to the unmetered street parking space for displaying on a device in a block 606.

The resulting method, process, apparatus, device, product, and/or system is straightforward, cost-effective, uncomplicated, highly versatile and effective, can be surprisingly and unobviously implemented by adapting known technologies, and are thus fully compatible with conventional manufacturing methods or processes and technologies.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    selecting a user's destination;
    determining an actual parking condition of an unmetered street parking space;
    determining a parking limitation for an un-sensored street parking space;
    extrapolating an estimated parking condition based on the actual parking condition proximate to the un-sensored street parking space;
    determining an estimated violation when the estimated parking condition is inconsistent with the parking limitation;
    generating an alert based on the estimated violation; and
    determining a travel path based on the actual parking condition from a user's current position to the unmetered street parking space for displaying on a device.

2. The method as claimed in claim 1 wherein determining the actual parking condition of the unmetered street parking space includes receiving a monitoring device reading, from a monitoring device associated with the unmetered street parking space, for providing the actual parking condition.

3. The method as claimed in claim 1 wherein:
    determining the actual parking condition includes receiving a monitoring device reading, from a monitoring device associated with the unmetered street parking space, for the unmetered street parking space for providing the actual parking condition; and
    extrapolating the estimated parking condition includes extrapolating the estimated parking condition for the un-sensored street parking space based on the actual parking condition.

4. The method as claimed in claim 1 further comprising:
    determining the parking limitation for the unmetered street parking space;
    determining the parking violation for the unmetered street parking space; and
    generating the alert based on the parking violation of the parking limitation.

5. A method of operation of a navigation system comprising:
    selecting a user's destination;
    determining an actual parking condition of an unmetered street parking space;
    determining a parking limitation of an un-sensored street parking space or the unmetered street parking space;
    extrapolating an estimated parking condition based on the actual parking condition proximate to the un-sensored street parking space;
    determining an estimated violation when the estimated parking condition is inconsistent with the parking limitation,
    generating an alert based on the estimated violation,
    determining a suggested parking space based on the actual parking condition as empty or the parking limitation allowing parking; and
    determining a travel path based on the actual parking condition from a user's current position to the suggested parking space for displaying on a device.

6. The method as claimed in claim 5 further comprising:
    determining a parked time in the unmetered street parking space;
    determining a future violation based on an inconsistency between the actual parking condition and the parking limitation; and
    generating the alert before the parked time violates the parking limitation based on the future violation.

7. The method as claimed in claim 5 further comprising:
    estimating a future parking condition at a future time for the unmetered street parking space; and
    generating the alert based on the future parking condition as empty at the future time.

8. The method as claimed in claim 5 further comprising:
    calculating a turnover rate based on the actual parking condition; and
    estimating a maximum availability time of the unmetered street parking space based on the turnover rate.

9. The method as claimed in claim 5 wherein determining the suggested parking space near the user's destination based on the actual parking condition as empty or the parking limitation allowing parking includes:
    calculating a travel time between the unmetered street parking space and the user's destination; and
    determining the suggested parking space based on the actual parking condition as empty, the parking limitation allowing parking, and the travel time.

10. A navigation system comprising:
    a control unit for selecting a user's destination;
    a parking space module, coupled to the control unit, for determining:
        an actual parking condition of an unmetered street parking space;
        a parking limitation for an un-sensored street parking space;
    an estimation module, coupled to the parking space module, for extrapolating an estimated parking condition based on the actual parking condition proximate to the un-sensored street parking space;
    a violation module, coupled to the estimation module, for determining an estimated violation when the estimated parking condition is inconsistent with the parking limitation;
    an alert module, coupled to the violation module, for generating an alert based on the estimated violation; and
    a path module, coupled to the parking space module, for determining a travel path based on the actual parking condition from a user's current position to the unmetered street parking space, the travel path for displaying on a device.

11. The system as claimed in claim 10 wherein the parking space module is for receiving a monitoring device reading, from a monitoring device associated with the unmetered street parking space, for providing the actual parking condition.

12. The system as claimed in claim 10 wherein:
    the parking space module is for receiving a monitoring device reading, from a monitoring device associated with the unmetered street parking space, for providing the actual parking condition; and
    the estimation module, coupled to the parking space module, is for extrapolating the estimated parking condition for the un-sensored street parking space based on the actual parking condition.

13. The system as claimed in claim 10 wherein:
    the parking space module is for determining the parking limitation for the unmetered street parking space;
    the violation module, coupled to the parking space module, for determining the parking violation for the unmetered street parking space; and
    the alert module, coupled to the violation module, for generating the alert based on the parking violation of the parking limitation.

14. The system as claimed in claim 10 wherein:
    the parking space module is for determining the parking limitation of the unmetered street parking space; and
further comprising:
    a suggestion module, coupled to the parking space module, for determining a suggested parking space based on the actual parking condition as empty or the parking limitation allowing parking.

15. The system as claimed in claim 14 wherein:
    the violation module, coupled to the parking space module, is for determining a parked time in the unmetered street parking space and for determining a future violation; and
    the alert module, coupled to the violation module, is for generating an alert before the parked time violates the parking limitation based on the future violation.

16. The system as claimed in claim 14 wherein:
    the estimation module, coupled to the parking space module, is for estimating a future parking condition at a future time for the unmetered street parking space; and
    the alert module is for generating the alert based on the future parking condition as empty at the future time.

17. The system as claimed in claim 14 further comprising:
    a turnover module, coupled to the parking space module, for calculating a turnover rate based on the actual parking condition; and
    an availability module, coupled to the turnover module, for estimating a maximum availability time of the unmetered street parking space based on the turnover rate.

18. The system as claimed in claim 14 wherein the suggestion module is for determining the suggested parking space near the user's destination based on the actual parking condition as empty or the parking limitation allowing parking, the suggestion module includes a travel time module for calculating the travel time between the unmetered street parking space and the user's destination.

* * * * *